United States Patent
Cirkic et al.

(10) Patent No.: US 10,623,072 B2
(45) Date of Patent: Apr. 14, 2020

(54) METHOD FOR ARBITRARY ANTENNA POWER PATTERN UTILIZING A MULTIPLE OF ANTENNA ELEMENTS

(71) Applicant: Telefonaktiebolaget LM Ericsson (publ), Stockholm (SE)

(72) Inventors: Mirsad Cirkic, Linköping (SE); Joel Berglund, Linköping (SE); Erik Eriksson, Linköping (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/302,495

(22) PCT Filed: May 20, 2016

(86) PCT No.: PCT/SE2016/050468
§ 371 (c)(1),
(2) Date: Nov. 16, 2018

(87) PCT Pub. No.: WO2017/200442
PCT Pub. Date: Nov. 23, 2017

(65) Prior Publication Data
US 2019/0280748 A1    Sep. 12, 2019

(51) Int. Cl.
*H04B 7/0456* (2017.01)
*H04B 7/06* (2006.01)
(Continued)

(52) U.S. Cl.
CPC ......... *H04B 7/0482* (2013.01); *H04B 7/0465* (2013.01); *H04B 7/0617* (2013.01);
(Continued)

(58) Field of Classification Search
CPC .. H04B 7/0482; H04B 7/0465; H04B 7/0617; H04B 7/0691; H04B 7/10; H04L 5/0007
See application file for complete search history.

(56) References Cited

U.S. PATENT DOCUMENTS

2014/0177466 A1* 6/2014 Inoue ................. H04B 7/0469
370/252
2015/0326297 A1 11/2015 Petersson et al.
(Continued)

FOREIGN PATENT DOCUMENTS

WO    2014206443 A1    12/2014

OTHER PUBLICATIONS

Faxer, Sebastian, et al., "A Codebook-Based Concept for Hybrid CSI Feedback in FDD Massive MIMO Systems", 2016 IEEE 83rd Vehicular Technology Conference (VTC Spring), May 15-18, 2016, 1-6.

*Primary Examiner* — Syed Haider
(74) *Attorney, Agent, or Firm* — Murphy, Bilak & Homiller, PLLC

(57) ABSTRACT

There is disclosed a method for operating a network node in a wireless communication network. The method comprises obtaining a first precoder and/or first beam pattern indication, and a second precoder and/or second beam pattern indication, the first precoder and/or first beam pattern indication being associated to beamformed transmission of first signaling utilizing a first antenna subarray, and the second precoder and/or second beam pattern indication being associated to beamformed transmission of second signaling utilizing a second antenna subarray. A first phase center is associated to the first signaling and a second phase center is associated to the second signaling, the first phase center and the second phase center having a phase center difference. The method further comprises transmitting the first signaling on a first expanded antenna subarray utilising a first
(Continued)

expanded precoder, and transmitting the second signaling on a second expanded antenna subarray utilising a second expanded precoder. A first expanded phase center is associated to the 15 transmitted first signaling, and a second expanded phase center is associated to the transmitted second signaling, the first expanded phase center and the second phase center having an expanded phase center difference; wherein the phase center difference corresponds to the expanded phase center difference.

12 Claims, 12 Drawing Sheets

(51) Int. Cl.
  *H04B 7/10* (2017.01)
  *H04L 5/00* (2006.01)
(52) U.S. Cl.
  CPC ............. *H04B 7/0691* (2013.01); *H04B 7/10* (2013.01); *H04L 5/0007* (2013.01)

(56) References Cited

U.S. PATENT DOCUMENTS

2017/0244533 A1* 8/2017 Onggosanusi ....... H04B 7/0478
2017/0288758 A1* 10/2017 Kakishima ............... H04B 7/04

\* cited by examiner

METHOD FOR ARBITRARY ANTENNA POWER PATTERN UTILIZING A MULTIPLE OF ANTENNA ELEMENTS

The present disclosure pertains to wireless communication technology, in particular in the context of multiple antenna technology.

BACKGROUND

In wireless communication technology, antenna arrays with increasing numbers of antenna elements are being used. This generally allows improved beamforming, more efficient use of power and better coverage and throughput. However, improved approaches of utilizing the antenna arrays are required. For example, the increased flexibility that comes with improved beamforming can lead to undesirably high signaling overhead.

SUMMARY

It is an object of the present disclosure to provide approaches allowing improved beamforming operation in wireless communication networks.

Accordingly, there is disclosed a method for operating a network node in a wireless communication network. The method comprises obtaining a first precoder and/or first beam pattern indication, and a second precoder and/or second beam pattern indication, the first precoder and/or first beam pattern indication being associated to beamformed transmission of first signaling utilizing a first antenna subarray, and the second precoder and/or second beam pattern indication being associated to beamformed transmission of second signaling utilizing a second antenna subarray. A first phase center is associated to the first signaling and a second phase center is associated to the second signaling, the first phase center and the second phase center having a phase center difference. The method further comprises transmitting the first signaling on a first expanded antenna subarray utilising a first expanded precoder, and transmitting the second signaling on a second expanded antenna subarray utilising a second expanded precoder. A first expanded phase center is associated to the transmitted first signaling, and a second expanded phase center is associated to the transmitted second signaling, the first expanded phase center and the second expanded phase center having an expanded phase center difference. The phase center difference corresponds to the expanded phase center difference.

Moreover, there is disclosed a network node for a wireless communication network, the network node being adapted for obtaining a first precoder and/or first beam pattern indication, and a second precoder and/or second beam pattern indication, the first precoder and/or first beam pattern indication being associated to beamformed transmission of first signaling utilizing a first antenna subarray, and the second precoder and/or second beam pattern indication being associated to beamformed transmission of second signaling utilizing a second antenna subarray. A first phase center is associated to the first signaling and a second phase center is associated to the second signaling, the first phase center and the second phase center having a phase center difference. The network node is further adapted for transmitting the first signaling on a first expanded antenna subarray utilising a first expanded precoder, and transmitting the second signaling on a second expanded antenna subarray utilising a second expanded precoder. A first expanded phase center is associated to the transmitted first signaling, and a second expanded phase center is associated to the transmitted second signaling, the first expanded phase center and the second expanded phase center defining an expanded phase center difference. The phase center difference corresponds to the expanded phase center difference. The network node may comprise a transmitting module for transmitting as described herein. It may be considered that the network node comprises an obtaining module for obtaining as described herein.

Generally, the first expanded antenna subarray may comprise more antenna elements than the first antenna subarray, and/or the second expanded antenna subarray comprising more antenna elements than the second antenna subarray.

It may be considered that the first signaling and/or the second signaling comprise reference signaling, in particular CSI-RS (Channel State Information-Reference Signal) signaling.

The first signaling and/or the first precoder may be represented by, and/or associated to, a first port, and the second signaling and/or the second precoder may be represented by, and/or associated to, a second port. It may be considered that the first expanded precoder may be represented by, and/or associated to, a first expanded port, and the second signaling and/or the second expanded precoder may be represented by, and/or associated to, a second port. The port association of the signaling may be dependent on the precoder considered.

The method may generally comprise, and/or the network node may be adapted for, one or more reiterations, such that for each iteration after the first, the first expanded precoder of the iteration before is used instead of the first precoder, and the second expanded precoder of the iteration before is used instead of the second precoder.

The polarization of the first subarray and/or the first signaling may be different, in particular orthogonal to, the polarization of the second subarray and/or signaling.

It may be considered that transmitting is based on a measurement reporting received from a terminal, which may be in response to an earlier iteration of transmitting. In particular, choice of expanded precoders and/or expanded ports may be dependent on such measurement reporting. The terminal may be a terminal targeted by the first signaling and/or second signaling.

The first signaling may comprise two reference signals, and the second signaling may comprise two reference signals. Each of the reference signals may be associated to a (different) port. The reference signals of each signaling may be considered to represent an aggregated port and/or to represent an aggregated reference signal.

The first signaling may generally have a polarization orthogonal to the second signaling. This may in particular be true for the case in which each signaling comprises two reference signals.

In a variant, the first signaling and the second signaling are transmitted using the same antenna subarray.

Generally, it may be considered that transmitting the first signaling and the second signaling comprises differential beamforming (DBF) and/or dual polarization beamforming (dpBF).

According to a further refinement, the method may comprise, and/or the network node may be adapted for, configuring a terminal for providing a measurement report based on the first signaling and the second signaling. The network node may comprise a configuring module for such configuring. Configuring may generally comprise transmitting, to the terminal, configuration data representing the configuration to be configured. The configuration data may indicate how and/or when and/or based on which measurements to provide a measurement report.

There is also disclosed a method for operating a terminal in a wireless communication network. The method may comprise performing measurement reporting based on a configuration configured by a network node. The configuration indicates that the reporting is to be performed on a first signaling comprising two reference signals, and a second signaling comprising two reference signals, wherein the first signaling and the second signaling have orthogonal polarizations. The signaling may be as described herein.

Moreover, a terminal for a wireless communication network is proposed. The terminal is adapted for performing measurement reporting based on a configuration configured by a network node, wherein the configuration indicates that the reporting is to be performed on a first signaling comprising two reference signals, and a second signaling comprising two reference signals, wherein the first signaling and the second signaling have orthogonal polarizations. The terminal may be adapted for such reporting and/or measurement. It may be considered that the terminal comprises a reporting module for such reporting and/or a measurement module for such measuring.

A program product may be considered. The program product comprises instructions, the instructions causing control circuitry to perform and/or control any one or any combination of the methods described herein, e.g. when executed on or by the control circuitry.

There is also disclosed a storage medium storing a program product as described herein.

The approaches described herein in particular facilitate improving the transmission power for signaling when using multiple antenna elements.

A wireless communication network may generally be any network providing radio access for telecommunication. It may comprise a Radio Access Network (RAN), e.g. according to UMTS, LTE or a related standard, a Next Radio standard or generally a 4G or 5G standard. A network node may generally be any radio network node, e.g. of a RAN. For example, a network node may be a base station, eNodeB, macro node, micro node, relay node, etc. A terminal may be any device providing a possible termination point for telecommunication utilising the wireless communication network. The terminal may be adapted for communication with or via the network, in particular a network node of the network. A terminal may be implemented as a user equipment (UE), or Machine-Type-Communication (MTC) device. It may be considered that a terminal is mobile, however, stationary terminals may be envisioned. A terminal may in particular be a smartphone, mobile phone, tablet, laptop, desktop computer, sensor arrangement or a machine adapted e.g. for MTC.

Transmitting the first signaling may comprise beamforming or beamformed transmission. It may be considered that transmitting the second signaling comprises beamforming or beamformed transmission. Beamforming or beamformed transmission of (e.g., first or second) signaling may generally utilize an antenna subarray having one or more (physical) antenna elements, in particular two or more antenna elements. The two or more antenna elements may comprise at least two antenna elements with different (orthogonal) polarizations, and/or beamformed transmission of a signaling (like the first and/or second signaling may comprise transmitting using (at least) two different polarizations, in particular two orthogonal polarizations. Thus, the signaling may be beamformed from transmissions having different polarizations (and/or utilising corresponding antenna elements).

Generally, it may be considered that transmitting the first signaling is based on beamforming using different polarizations, and/or that the first expanded antenna subarray comprises, and/or the first expanded precoder pertains to, at least two antenna elements having different polarizations, or transmitting, and/or controlled for transmitting, at different polarizations. The different polarizations may in particular be orthogonal polarizations. Alternatively or additionally, it may be considered that transmitting the second signaling is based on beamforming using different polarizations, and/or that the second expanded antenna subarray comprises, and/or the second expanded precoder pertains to, at least two antenna elements having different polarizations, or transmitting, and/or controlled for transmitting, at different polarizations. The different polarizations may in particular be orthogonal polarizations. The antenna elements (e.g., of the first and/or second expanded antenna subarray) may be adapted accordingly, e.g. due to construction and/or arrangement. For example, crossed dipole antenna elements represent antenna elements with different polarizations. However, different arrangements may be considered, e.g. loop antennas (which may be controlled to have different polarizations). Polarization may for example be elliptical, or linear or circular; different antenna elements may generally be adapted for different types of polarization. Generally, the first expanded antenna subarray may comprise at least two (physical) antenna elements with different polarizations, e.g. crossed dipole elements and/or loops. Alternatively or additionally, the second expanded antenna subarray may comprise at least two (physical) antenna elements with different polarizations, e.g. crossed dipole elements and/or loops. The (total) polarizations of the first expanded antenna subarray and the second expanded antenna subarray (respectively the first signaling and the second signaling) may be essentially parallel.

A beam pattern indication may indicate a beam pattern for an associated signaling, in particular an intended or desired beam pattern. A precoder (in particular, the first and/or second precoder) may be seen as a beam pattern indication. It may be considered that a beam pattern indication comprises one or more parameters or parameter sets, and/or a list or matrix of parameters or indications, indicating (desired) characteristics of the beam pattern indicated. Such characteristics may represent or comprise beam width and/or form and/or spatial angle and/or plane angle(s), e.g. in one or more 2d-projections or cuts, and/or direction and/or lobe form, etc. The first expanded precoder, and/or transmitting the first signaling, may be based on the first beam pattern indication, and/or adapted or performed to match beam pattern characteristics indicated by the first beam pattern indication. Alternatively or additionally, the second expanded precoder, and/or transmitting the second signaling, may be based on the second beam pattern indication, and/or adapted or performed to match beam pattern characteristics indicated by the second beam pattern indication.

BRIEF DESCRIPTION OF THE DRAWINGS

The drawings are provided to illustrate concepts and approaches of the disclosure and are not intended as limitation. The drawings comprise:

FIG. 11, showing an exemplary method for operating a terminal; and

DETAILED DESCRIPTION

Figure 1:
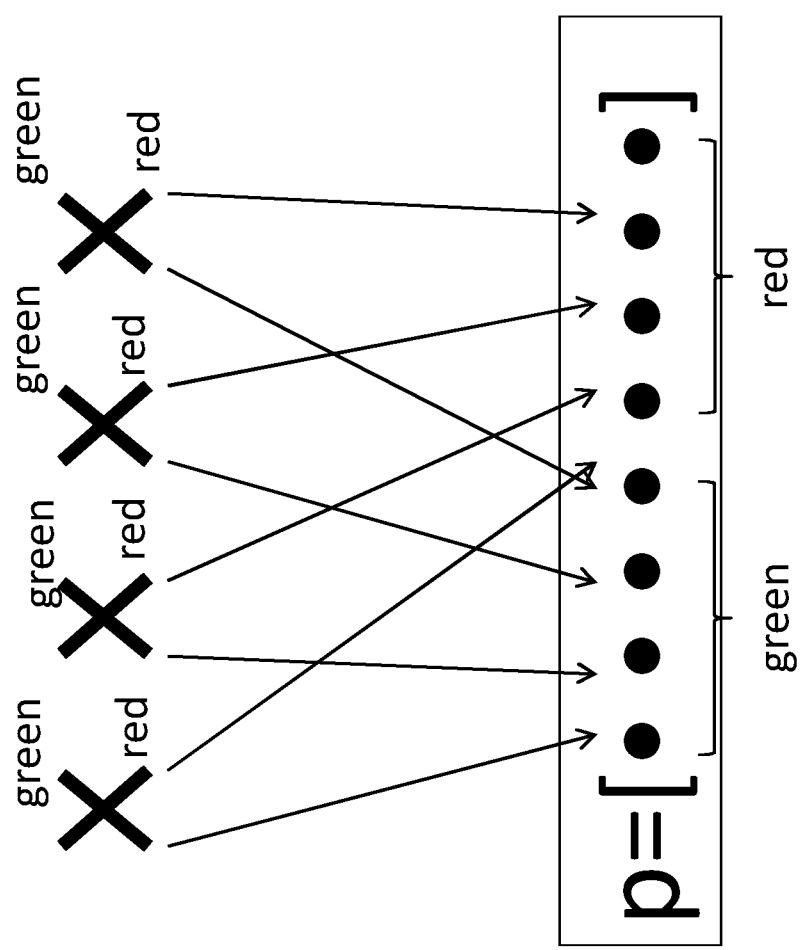
FIG. 1, showing a mapping of antenna elements to a precoder.

The modernization of antenna technologies in practice is moving forward in a high pace, which enables the use of more advance antenna setups and techniques in order to increase throughput and robustness in a mobile radio network. One such technique is to shape the beams (beamforming) of the antenna array. With the use of so called reconfigurable antenna systems (RAS), which are already available in practice, beamforming is made possible. The gains that can be achieved with such techniques are promising and seem to be of great importance to achieve the goals of future radio networks.

From LTE release 10, CSI-RS was introduced together with the introduction of transmission mode 9. The principle of transmission mode 9 is that CSI-RS are sent in the downlink, one for each antenna port, and that the UE gives feedback in the form of CQI, RI and PMI where PMI indicates the UE choice of precoder from a pre-defined codebook for downlink data transmissions. In transmission mode 9, there can be at most eight number of antenna ports within the same CSI-process. Standard-defined precoders are associated to the ports.

For antennas (antenna arrays) with more than eight steerable antenna elements, normal operation with transmission mode 9 cannot utilize all the antennas as there are only eight antenna ports. There are, however, techniques to overcome this problem. With differential beamforming (DBF), the port-antenna mappings are changed over time such that the aggregation of the reported precoders for different antenna-port mappings gives an effective reporting corresponding to more than eight ports. With the DBF procedure, in the initial step the antenna-ports are typically first made wide and are step-by-step made narrower. This approach may be generalized to antenna arrays with more than 8 antenna elements and/or with more possible (useful) antenna subarrays than defined ports. It should be noted that this approach, like the other approaches described herein, are not necessarily limited to transmission mode 9, but are more widely applicable.

For initial transmissions, when wide beams are used for DBF, there are typically few antenna elements mapped to an antenna-port-mapping. In worst case, there will only be one antenna-element per port. When the CSI-RS are sent out with these ports, the effective output power will be relatively low as the power amplifiers (PA) of many antenna-elements are not part of the CSI-RS transmission. This means that when having a wide beam, not only the antenna gain but also the output power will be low, which is a problem in terms of coverage.

There is disclosed a method that facilitates creating wide beams with the full power, or a significant part thereof, of an antenna array, with power amplifiers per element or subarray, by utilizing more or all elements of the antenna array. Transmitting reference signals like CSI-RS over one antenna port may utilize different subarrays of the array over two "nearly" mutually orthogonal polarizations. Further, a new type of reporting may be configured or utilised, that inform the UE over which reference signals to measure and/or to provide a measurement report, e.g. a CSI report, which may comprise CQI and/or PMI and/or RI values.

The full power of the whole array will be enabled in order to transmit a wide beam that in a conventional transmission only can be transmitted from a portion of the array with less power. Apart from the power gain of the full array as compared to that of the subarray, approaches herein also may facilitate an averaging (calibration) gain in the effective estimation of beam angle (BA). This is due to the same reference signal being sent over a "repeated" beam pattern over a multiple of antennas, which may average out small calibration differences between the antenna elements.

In some applications, e.g. related to DBF, two signalings (e.g., a first and a second signaling) comprising e.g. reference signals, for example CSI-RS, are transmitted over two antenna ports respectively utilizing corresponding precoders. A receiving UE or terminal measures the channel/s to the two antenna ports in order to estimate the phase offset between the reference signals (e.g. closed loop 2TX codebook in TX mode 9). In DBF, each such reference signal is transmitted with a certain beam width. Hence, a wide beam may be constructed for a particular port, which is associated with at least one reference signal.

Generally, "dual polarization beamforming" (dpBF) may be utilised. In dpBF, the same reference signal is being transmitted over a set of antennas of a first polarization and a second, "nearly" mutually orthogonal polarization. Thereby, an (total) antenna power pattern may be created that corresponds to the intended beam pattern of the reference signal, e.g. as seen from a receiving device like a User Equipment. A procedure that transmits at least 2 reference signals may be of particular consideration.

Specifically, a transmitting node may be considered that is adapted to transmit and/or transmits an intended (in particular, wide) beam pattern using a plurality of antenna elements for at least one reference signal.

The intended beam pattern may be represented in this example with a precoder $P=[p\ p']=[p_1\ p_2\ p'_1 p'_2]$ wherein $p_1$ and $p'_1$ correspond to a first and a second "nearly" mutually orthogonal polarization of virtual antenna elements $i=\{1,2\}$, see FIG. 1. A virtual antenna element, e.g. $i=1$, can itself comprise a plurality of physical antenna elements. To construct a beam power pattern that is equivalent to that of P with twice as many physical antenna elements, a new (expanded) precoder may be constructed, e.g.

$$P_{new}=[p_{new} p'_{new}], \text{ wherein } p_{new}:=[p\ p'] \text{ and } p'_{new}:=[p\ -p].$$

Figure 2:
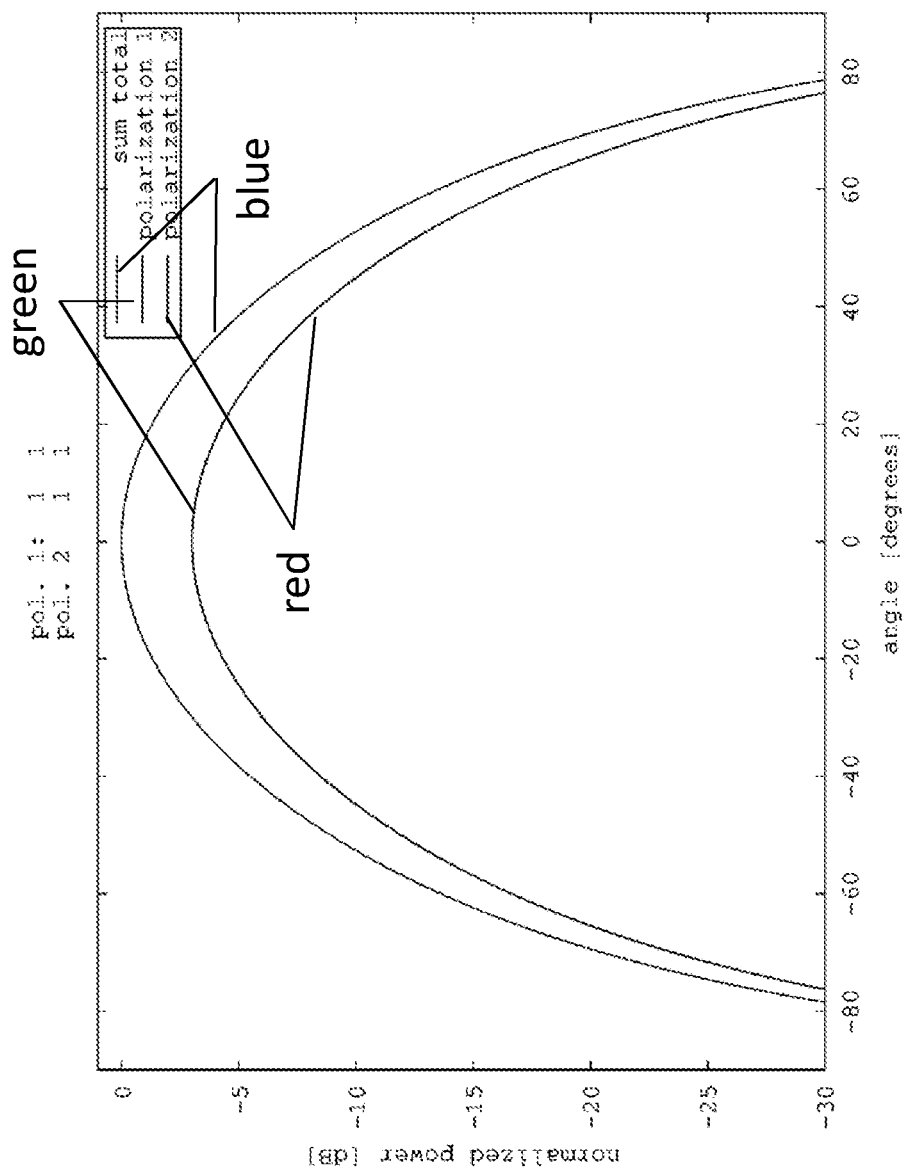
FIG. 2, showing a beam pattern.
Figure 3:
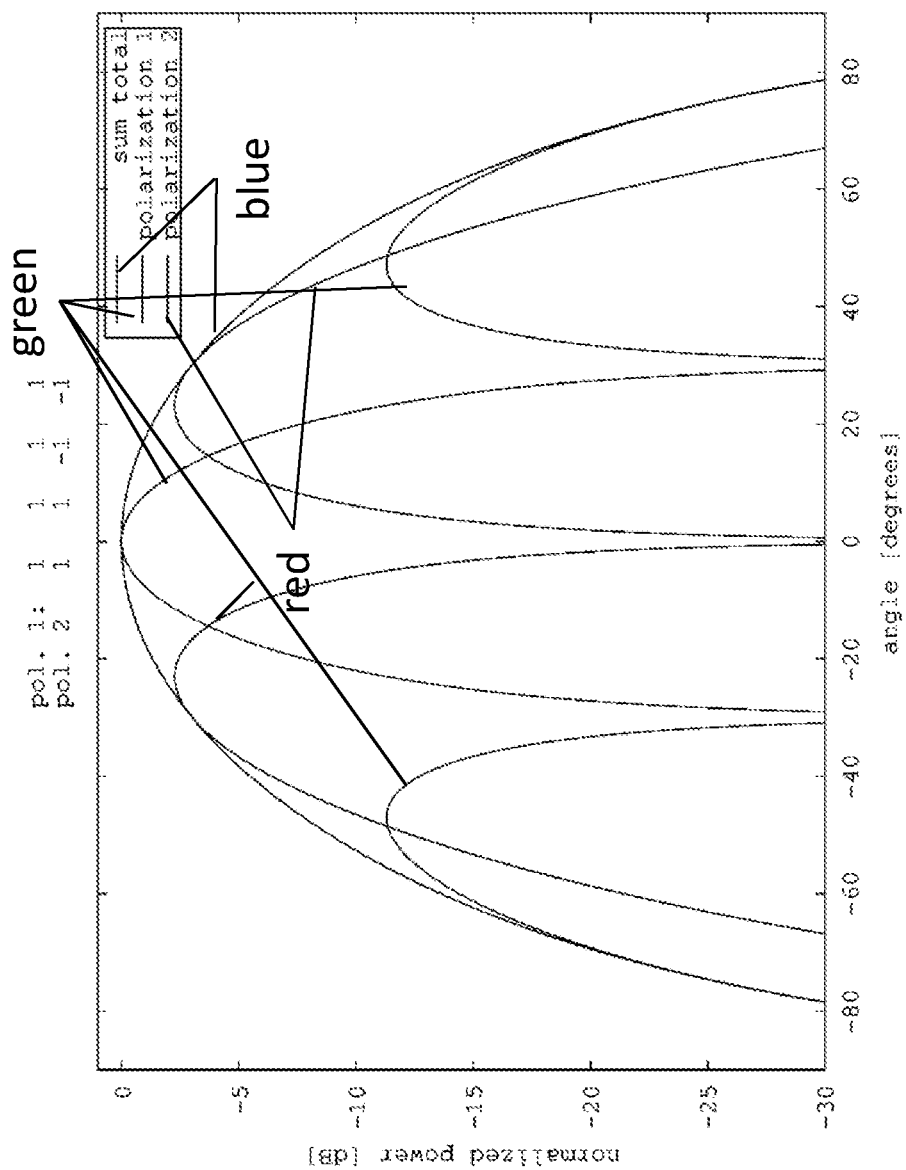
FIG. 3, showing the beam pattern of FIG. 2 using a first antenna expansion.
Figure 4:
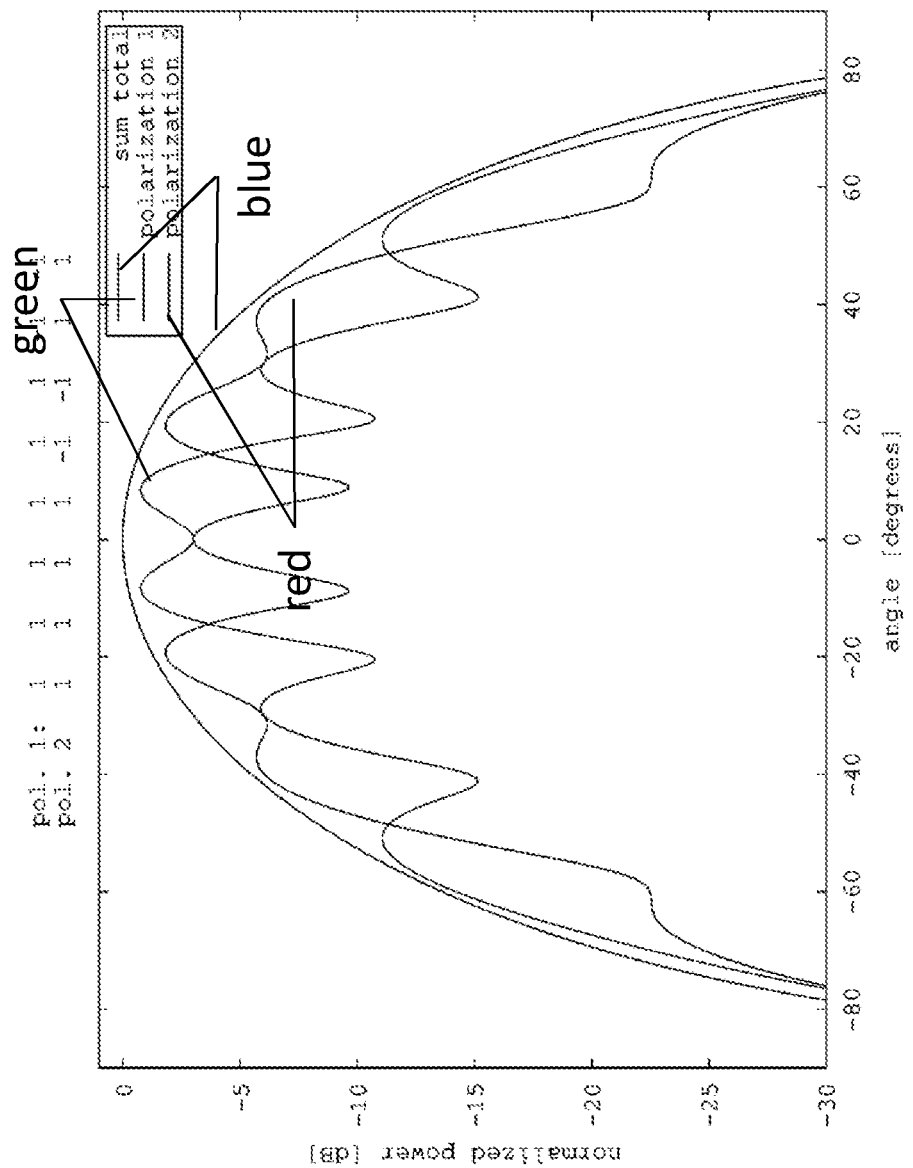
FIG. 4, showing the beam pattern of FIG. 2 using a second antenna expansion.

To achieve the same power pattern with an additional doubling of the antennas, a solution may comprise setting $P=P_{new}$, and the operation may be repeated. This may be called "antenna expansion", see FIG. 2-4 for examples.

These examples show cases in which the desired beam pattern can be achieved using a total of two, four and eight physical dual-polarized antenna elements, respectively. The example of two dual polarized physical antenna elements (FIG. 2) illustrates the intended beam pattern and the remaining examples (FIG. 3-4) illustrate the expanded versions.

Spatial beamforming, as discussed herein, involves transmission of a signal over multiple ports (and/or antenna elements or subarrays), with almost identical polarization and with a phase difference applied corresponding to a desired beam pointing direction. Moreover, for feedback based beamforming, there is a need for the receiving node like a UE to measure phase differences between reference signals transmitted over at least two ports with different phase centers (so that there can be a phase difference).

At least another reference signal may be transmitted from another set (subarray) of antenna elements, for example in order to get a phase offset report between the reference signals so that the two sets (subarrays) of antenna elements can be combined and hence a narrower beam pattern created, as is done in DBF.

Figure 5:
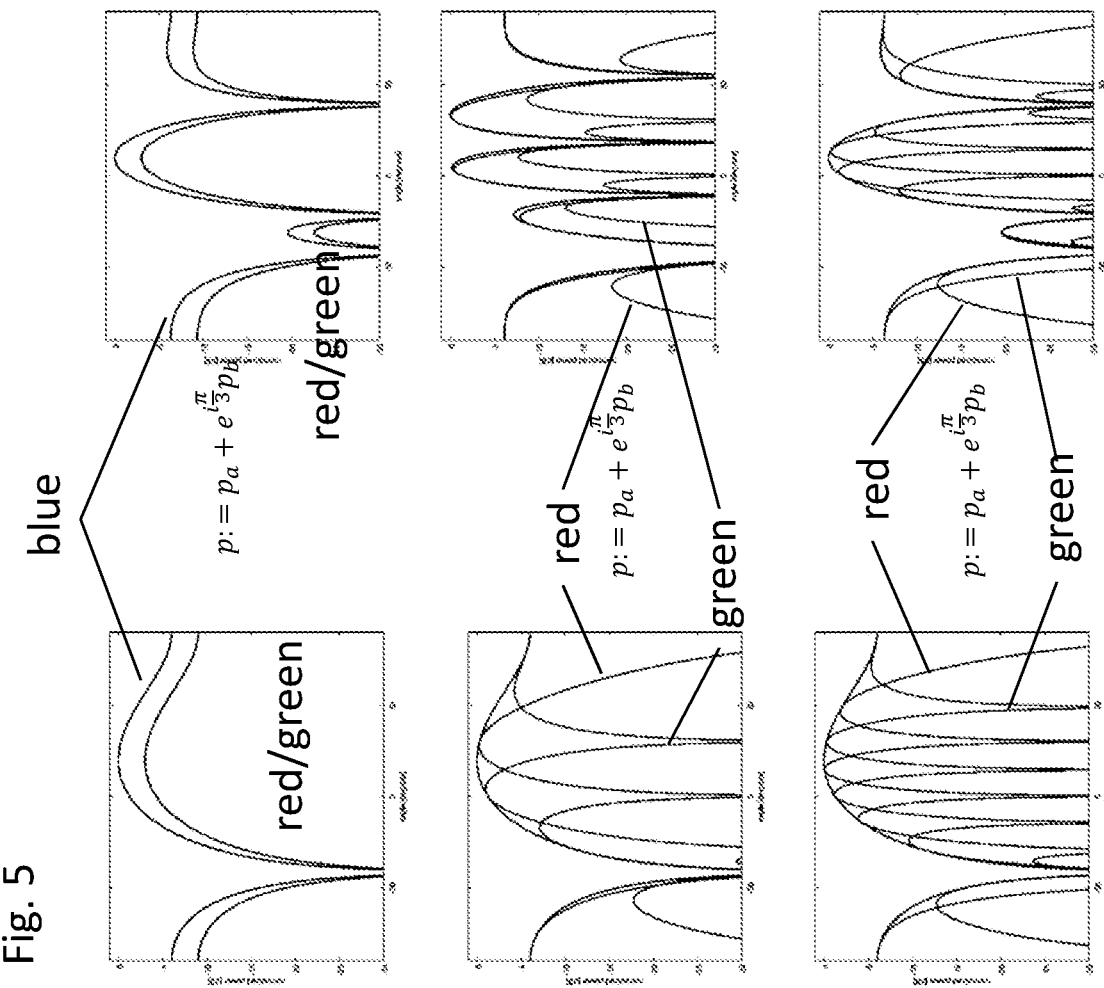
FIG. 5, showing antenna expansion steps performed for an original precoder.

In FIG. 5a, there is shown an example with two ports for transmitting reference signals, $p_a$ and $p_b$, with a desired beam pattern having a desired phase center difference. As can be seen, each port feeds four antenna elements. Thus, given that the utilized antenna array is much larger than four antenna elements, and equipped with one power amplifier per antenna element, the output power will be quite low compared to total available output power.

For this reason, it may be desirable to utilize more antenna elements per port (respectively, the associated signaling), but at the same time keep both the beam shapes and the phase center distance. FIG. 5b shows an example for this approach. In this approach, the antenna array is divided into in two halves (subarrays), wherein the left half is dedicated to the first reference signal (which may be referred to as signal or port "a"), and the second half to the second reference signal (which may be referred to as signal or port "b"). The original precoders (e.g., pre-defined, in particular by a standard), for a first signaling of port or signal "a" and a second signaling of port or signal "b", may be referred to as $P_a=[p_a\ 0\ p'_a\ 0]$ and $P_b=[0\ p_b\ 0\ p'_b]$, respectively. Typically $p_a$ and $p_b$ may be considered to represent two antenna ports with essentially identical characteristics, except the different spatial locations of the phase centers of the signals, representing a phase center difference. Accordingly, $p_a=p_b$ and $p'_a=p'_b$ holds.

With an antenna array of twice as many antenna elements (respectively, a corresponding subarray) as associated to the original precoder, the approach would then yield precoders that are $[p_a\ p'_a\ 0\ 0\ p_a\ -p'_a\ 0\ 0]$ for port "a" and $[0\ 0\ p_b\ p'_b\ 0\ 0\ p_b\ -p'_b]$ for port "b", see FIG. 5b.

This will, however, yield beam patterns that are far from the intended ones indicated by the original precoders, with lots of grating lobes and low beamforming performance due to the large spacing between phase centers for the two ports (phase center difference).

In another approach, precoders with good utilization of the power amplifiers and/or antenna elements may be designed or defined, which at the same time provide the shape of the power patterns as well as the distance between phase centers as desired. In this approach, it may be considered to, in an expansion step, to replace the original precoders with expanded precoders $[p_a\ 0\ p'_a\ 0\ p_a\ 0\ -p'_a\ 0]$ for port "a" and $[0\ p_b\ 0\ p'_b\ 0\ p_b\ 0\ -p'_b]$ for port "b". This mapping results in the same beam power pattern per port and keeps the same phase center spacing (expanded phase center difference) between the ports as the original precoders, see FIG. 5c. This may be referred to as keeping the phase centers consistent.

An application of this approach is in the DBF procedure, in which the first steps of the procedure, only a part of the antenna array or subarray is used to transmit reference signals.

Hence, there is suggested expanding the original precoder/s (which then is used only as "specification" of desired beam width and phase center distance) to expanded precoder/s, giving an intended power pattern created by the different steps in DBF and keeping the phase centers of the ports consistent (respectively using an approach which gives the desired phase center distance).

Accordingly, the mapping between the physical antennas and the precoded virtual ports would be essentially or completely transparent, in particular for the intended receiver, which could not determine from the signals alone which precoders have been used to transmit the received signaling. That is, the original beam power pattern would be equivalent to the physical beam power pattern as given by the expanded precoders respectively the weights. In summary, for a particular step in DBF and for a fixed "original precoder" that yields certain antenna weights which activates a number of antenna-elements (non-zero antenna weights), antenna expansion will be repeated (re-iterated) until an allowed portion of the array is activated. For another step, with a different "original" precoder, the antenna expansion might be repeated fewer or more times depending on whether this different precoder yields fewer or more active antenna elements.

Figure 6:
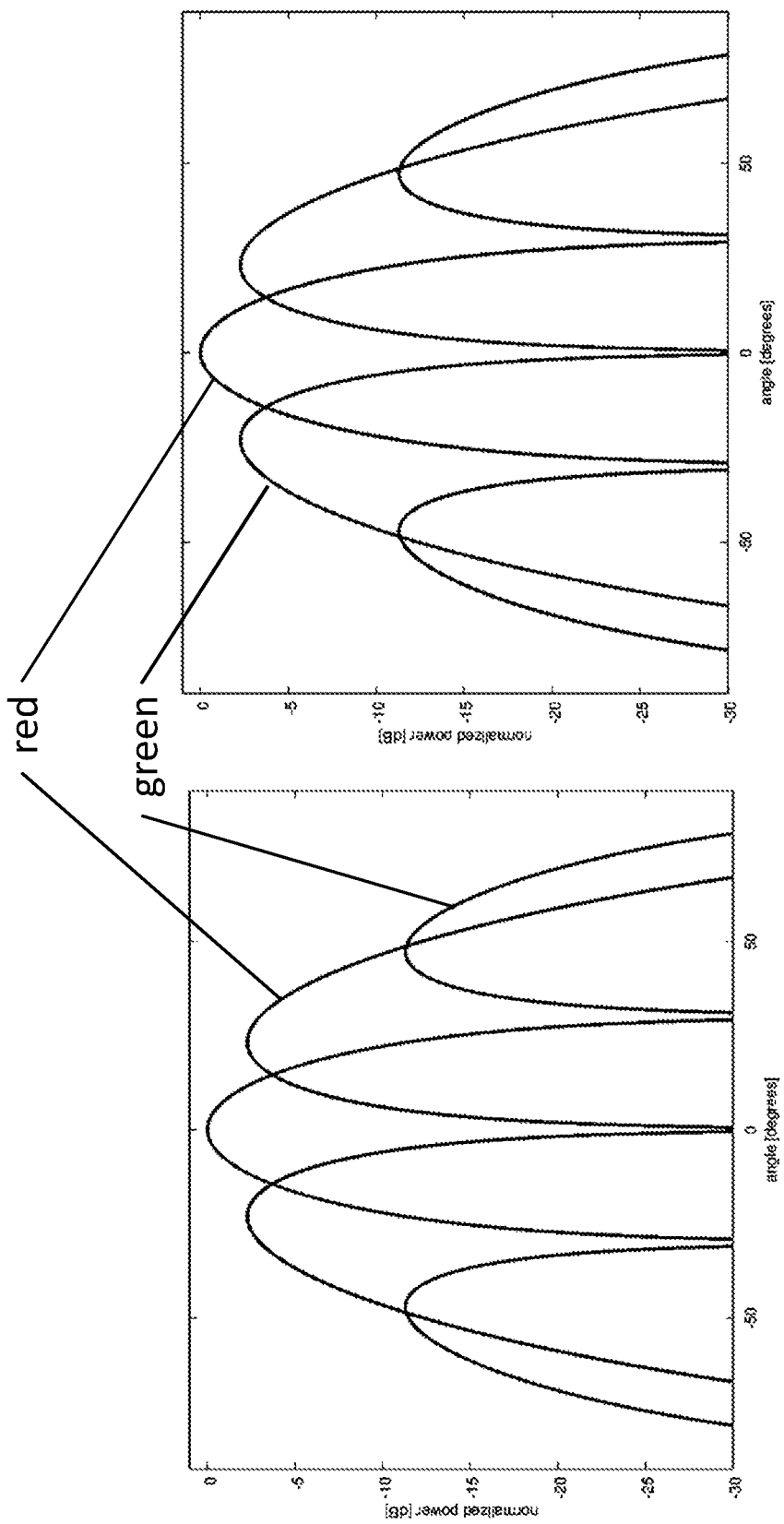
FIG. 6, showing beam patterns.

Another embodiment comprises aggregating the measurements of "virtual" ports in order to mitigate the issues arising when one polarization fades out. In FIG. 6, the green curves represent a polarization 1 and the red curves represent a polarization 2. If for instance, polarization 1 fades out and a signal using the pattern in FIG. 6A is transmitted, then a receiver that is located at an angle of 0 degrees will not see the signal at all.

However, if another signal related to the previous signal is transmitted (e.g., two reference signals are transmitted) using an orthogonal polarization, the receiver will be able to see the second signal since it would be transmitted over polarization 2 at that angle. The receiver (e.g., a terminal) should be informed that the two reference signals (associated to virtual ports) are actually comprising one "aggregated" port whose measurements should be aggregated, respectively should be configured accordingly.

In DBF, the receiver estimates the channel coefficients of two reference signals, and reports how to best combine them to increase the received signal quality. To mitigate the mentioned issue of fading polarizations, two aggregated ports of two (logical) ports each (4 logical ports in total) would be required. The receiver would also need to be informed which of the logical ports are aggregated and hence over which pairs of logical ports to report the best combination (i.e., 2TX codebook precoder).

In one embodiment, a second set of reference signals are transmitted using the same antenna elements as the first set, but utilizing (almost) orthogonal polarizations. This can be achieved, e.g., by switching the precoder for respective polarization. Hence, for a given port "a" in the first set of reference signals, $p_a=[p_a\ p'_a]$ a corresponding switched port "a" (referred to as a̲) $p_{\underline{a}}=[p_a p'_a]$ may be used for the second set of reference signals. The way, this port is constructed, consists of flipping and conjugating the coefficients of $P_a$ as $p_{\underline{a}}=[p'_a F\ -p_a F]^*$ wherein F is a mirror matrix that reverses the order of the vector elements. Due to phase shifting one of the polarizations by 180 degrees, the resulting signal will have orthogonal polarization. The same expansion as above can then be repeated for the remaining ports in the two sets of reference signals. This would create a virtual antenna with 2 cross-pole elements for example while using the same antenna subarray.

It would be possible to apply normal 4 Tx code book to these reference signals. In some embodiments, only the relative phase between the first set of ports or between the second set of ports is of interest, e.g. to enable a more narrow beam using correlated antenna elements. In these cases, a 4 Tx codebook may provide lower accuracy and provide unnecessary overhead in signaling and computation.

In some embodiments, the targeted information is acquired by, and/or the terminal may be configured for, two separate (measurement) reportings or reports for the two sets of ports. The network node or base station receiving the reports may determine a resulting precoding to use by combining the two results (reports). The combining in some embodiments may take a corresponding quality measure related to each report into account.

In a further embodiment, measurement results or corresponding reports may be combined by the receiver or terminal, which may be configured for such reporting. Combining measurement reports for different reference signaling may be considered processing or evaluating measurement results or reports. In this case, a report may represent a single precoder selection, which may be based on the combination of measurement results or reports. The reported precoding may be based on a joint analysis of the separate measurements pertaining to the first and the second set of reference signals or signalings. The analysis may in some embodiments take the quality of the signals into account. The reporting could comprise Specifically, an option 1 may comprise:

Based on configuring a first CSI process using two ports having the first polarization, and based on configuring a second CSI process using two ports having the second polarization, reporting CSI, in particular PMI, e.g. PMI for both CSI processes or only the best CSI process (e.g., in terms of expected channel quality)

The network node may, based on the received report/s, compute a resulting beamforming and/or suitable precoders, e.g. combining reports. The network node may be adapted accordingly and/or comprise a computing module for such computing.

An option 2 may comprise:

Based on configuring one CSI process using two ports of each polarization (4 in total), reporting CSI, in particular PMI, over all four ports.

The network node may combine the phase offsets indicated between the respective pair of ports on each polarization, or be adapted accordingly, or comprise a corresponding combining module.

An option 3 may comprise:

Based on configuring one CSI process using two ports of each polarization (4 in total), report CSI, in particular PMI, for two ports computed as an average over the two pairs of ports, e.g. selecting a preferred or the strongest pair, and/or averaging over both pairs, and/or performing weighted averaging based on signal strength of each pair.

The network node may apply, and/or be adapted for applying, or comprise an applying module for applying, the reported precoder for update of mapping and/or applying beamforming based on the reported information, e.g. PMI.

Configuring for the options may be based on configuration data received from the network node. Generally, a network node may be adapted for beamforming based on received measurement reporting, e.g. CSI reporting. CSI reporting may generally be performed by a terminal.

There is disclosed an approach to realize wide beam transmission using many antenna elements while maintaining the "virtual" antenna separation between two antenna ports, respectively the phase center difference. The approach may be realized by utilizing an antenna expansion technique and two polarizations.

Further, there is suggested how to create two sets of these ports, creating a virtual 4 Tx cross-pol and means to realize phase offset reporting for the directional beamforming.

In one embodiment, the reports are aggregated at the network node or BS based on separate terminal or UE measurements and in another embodiment measurements are aggregated by the terminal or UE, which will report or feed back one already combined report.

The description herein is pertains to two sets of ports, one set for each of two polarizations and where each set comprises two ports. However the same technique is applicable also for more ports, for example 8 dual polarized ports with four ports per polarization. A dual polarized port may comprise ports or antenna elements with different, in particular orthogonal, polarization.

Figure 7:
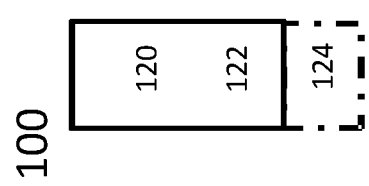
FIG. 7, showing an exemplary network node.

FIG. 7 schematically show an example of a network node 100, which in particular may be a base station or eNodeB (also referred to as eNB). Network node 100 comprises control circuitry 120, which may comprise a controller connected to a memory. The control circuitry 120 is operably connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules of the network node may be implemented in the circuitry of the network node.

Figure 8:
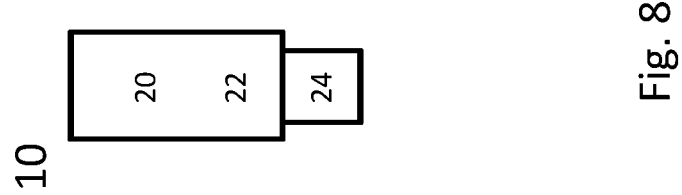
FIG. 8, showing an exemplary terminal.

FIG. 8 schematically shows a terminal 10, which may in particular be implemented as a user equipment. Terminal 10 comprises control circuitry 20, which may comprise a controller connected to a memory. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network, in particular a base station. The terminal 10 may be adapted to carry out any of the methods for operating a terminal disclosed herein; in particular, it may comprise corresponding circuitry, e.g. control circuitry. Modules of the terminal may be implemented in the circuitry of the terminal.

Figure 9:
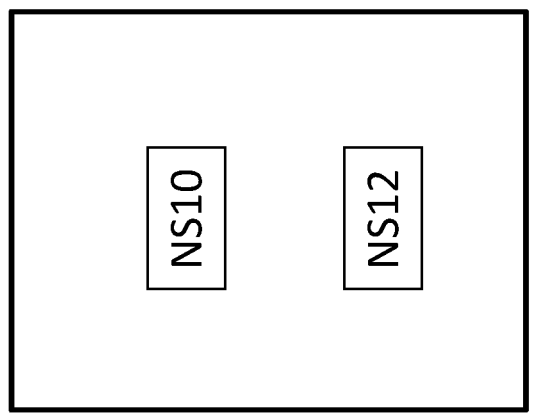
FIG. 9, showing an exemplary method for operating a network node.

FIG. 9 shows an exemplary method for operating a network node, which may be any of the network nodes described herein. The method comprise an action NS10 of obtaining a first precoder and a second precoder, the first precoder being associated to beamformed transmission of first signaling utilizing a first antenna subarray, and the second precoder being associated to beamformed transmission of second signaling utilizing a second antenna subarray. A first phase center is associated to the first signaling and a second phase center is associated to the second signaling, the first phase center and the second phase center having a phase center difference. The method further comprises an action NS12 of transmitting the first signaling on a first expanded antenna subarray utilising a first expanded precoder, and transmitting the second signaling on a second expanded antenna subarray utilising a second expanded precoder, wherein a first expanded phase center is associated to the transmitted first signaling, and a second expanded phase center is associated to the transmitted second signaling, the first expanded phase center and the second phase center having an expanded phase center difference; wherein the phase center difference corresponds to the expanded phase center difference.

Figure 10:
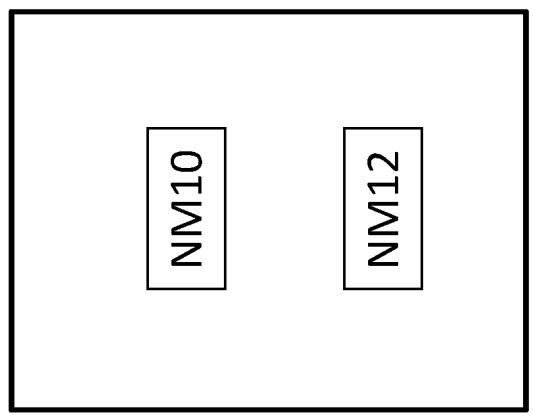
FIG. 10, showing another exemplary network node.

FIG. 10 shows an exemplary network node. The network node may comprise an obtaining module NM10 for performing action NS10. The network node also comprises a transmitting module NM12 for performing action NS12.

FIG. 11 shows an exemplary method for operating a terminal in a wireless communication network, which may be any of the terminals described herein. The method comprises an action TS10 of performing measurement reporting based on a configuration configured by a network node (100), wherein the configuration indicates that the reporting is to be performed on a first signaling comprising two reference signals, and a second signaling comprising two reference signals, wherein the first signaling and the second signaling have orthogonal polarizations.

Figure 12:
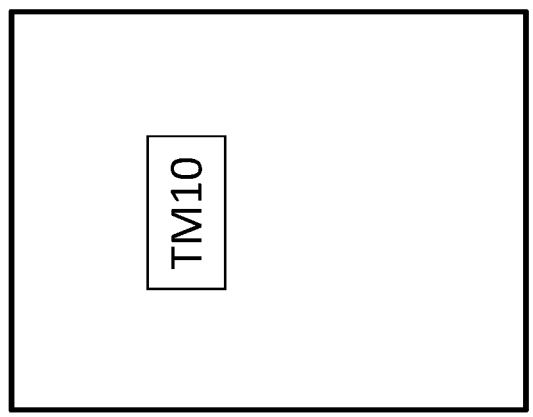
FIG. 12, showing another exemplary terminal.

FIG. 12 shows an exemplary terminal. The terminal may comprise a measurement reporting module TM10 for performing action TS10.

Polarizations in some variants may be either almost the same (parallel) or almost orthogonal, depending on the situation. The electrical field (e.g., of a signal transmitted) by a vector containing the complex field components along two spatially orthogonal basis vectors $\hat{\theta}$ and $\hat{\phi}$ $$e = \begin{bmatrix} e_\theta \\ e_\phi \end{bmatrix}$$

Polarization parallelity (which is a parameter characterising the relationship between the polarizations of two fields or signals) between two fields $e_1$ and $e_2$ is defined as $$polpar = \left| \frac{(e_1^* \cdot e_2)}{\sqrt{(e_1^* \cdot e_1)(e_2^* \cdot e_2)}} \right|$$

where * denotes complex conjugate and || magnitude. Polpar is obviously a real number with magnitude in the interval [0 1].

Polarization orthogonality is defined as polorth=1−polpar

In case coherent addition of electrical fields is the object, it is desired (in an optimal case) that the polarization parallelity takes the value 1. In case non-coherent addition of electrical fields is the object, it is desired (optimal) that the polarization parallelity takes the value 0. For practical antenna systems it is not possible, or even necessary, to reach the optimal values of either 1 or 0 for the polarization parallelity. Typically one only need to be "sufficiently close" to the optimal value.

For the approaches described herein, fields or signals may be considered to be orthogonal if they parallelity is (about) 0.6 or lower, correspondingly their orthogonality may be (about) 0.4 or higher.

An antenna array may generally comprise a plurality of antenna elements, in particular for wireless transmission and/or reception. The antenna array may be adapted for MIMO (Multiple-Input, Multiple/Output) operation. The plurality of antenna elements in particular may comprise a multitude or power of 2 antenna elements, in particular 8 or more than 8 antenna elements. Each antenna elements may be a physical antenna element and/or be independently controllable. An antenna element may be considered independently controllable if it can be supplied with a signal and/or electromagnetic current independent and/or separately from another antenna element. To each antenna elements may be associated at least one amplifier and/or pre-amplifier, which may independently controllable in an analogous manner. An antenna element and its associated amplifier/s and/or pre-amplifier/s may be controllable together. Generally, the antenna elements of an antenna array may be arranged such that beamforming (in particular spatial beamforming) may be performed utilizing and/or controlling the antenna elements. A subarray of the antenna array may comprise one or more antenna elements of the antenna array, in particular one or more than one independently controllable antenna elements. An antenna array or subarray may be a two-dimensional array (e.g., arranged in a plane) or a three-dimensional array.

An antenna element may be a physical antenna element, which may have associated to it a polarization. The polarization of a physical antenna element may be controllable and/or be dependent on the physical characteristics of the antenna element. A subarray may have associated to it a polarization, which may be controllable. The polarization of a subarray may be based on and/or represent the total of the polarizations of the antenna elements of the subarray. It should be noted that the terms polarization of an antenna element or subarray and polarization of signaling transmitted by the element or subarray may be used interchangeably, respectively may be representative of each other, as the polarization of signaling is dependent on the polarization of the antenna elements or subarray used to transmit it. The (or at least some of the) antenna elements of an array or subarray may be pairwise orthogonally polarized, e.g. due to structure or arrangement of the (physical) antenna elements.

Generally, an antenna element may be a physical antenna element or a virtual antenna element. A virtual antenna element may comprise one or more physical antenna elements, and provide a logical representation of the physical antenna element/s as one virtual antenna element. An antenna element, in particular a physical antenna element, may be controllable separately from other (physical antenna elements), in particular for transmission. Such an antenna element may also be referred to as steerable antenna element. It may be considered that separately controllable antenna elements may be operated with different transmission parameters, e.g. in terms of transmission power and/or phase of a transmission and/or transmission frequency (of transmitted radiation) and/or polarization. It may be considered that a physical antenna element has associated to it and/or comprises a power amplifier, which may be separately operable from power amplifiers associated to other power amplifiers of other physical antenna elements. It may be considered that a polarization is associated to an antenna element, e.g. due to form and/or spatial arrangement of a physical antenna element. The polarization of a virtual antenna element may be defined by the individual polarizations of its physical antenna elements. The polarization of a group of antenna elements may be based on the individual polarizations of its antenna elements.

The term antenna port, or short port, may pertain to a mapping of a channel and/or transmission parameters and/or (associated) signaling to one or more antenna elements and/or a subarray of antennas. A port may e.g. be defined in a telecommunications standard like LTE. A port may represent a signaling and a mapping of the at least one signaling to a plurality of antenna elements, and may generally be associated to a precoder (corresponding to the mapping). The signaling may comprise a reference signal, in particular a reference signal pertaining to channel state information, e.g. a CSI-RS (Channel State Information-Reference Signal). A port may also be referred to as antenna port. There may generally be defined a given (and/or limited) number of different ports, e.g. according to a standard. The number of ports may e.g. be 8, or more generally a multitude of 2.

Beamformed transmission of signaling may comprise beamforming to transmit a beam pattern. Beamforming may be based on a precoder. A precoder may represent a beamforming configuration, in particular a mapping for a signal to a plurality of antenna elements, in particular for beamforming and/or MIMO operation. It may be considered that a precoder is represented by a matrix and/or comprises weights for controlling different antenna elements of a subarray for beamforming. A precoder, in particular a first or second precoder (e.g., of a first iteration described herein) may be associated to a codebook. A codebook may comprise a plurality of precoders associated to allowed beamforming configurations, e.g. based on a standard like LTE and/or operating conditions, based on which a standard-defined codebook for example may be limited. When beamforming, a desired signaling is provided by the overlay of the radiation patterns transmitted by the antenna elements of the subarray used for beamforming according to the precoder used. A precoder may generally be associated to and/or pertain to and/or address a subarray of antenna elements used for beamforming to provide the desired signaling (respectively port). Generally, a precoder may pertain to one or more, in particular two or more, (physical) antenna elements, which may be intended for use in transmission (e.g., provided with non-zero signal amplitude for transmission).

A phase center (or apparent phase center) of radiation may be considered as the apparent source of radiation (signaling), in particular as seen by a receiver, which may be the intended receiver like a terminal. A phase center difference may be a difference, in particular a spatial difference, between the phase centers of two signaling. Two phase center differences may be considered to be corresponding to each other if they have the same numerical value and/or are essentially equal or equal. Two phase center differences may be considered to be essentially equal if their values lie within 10% or less, or 5% or less, or 1% or less (of the magnitude of the larger magnitude phase center difference) of each other.

Signaling may comprise one or more signals and/or symbols, e.g. one or more reference signals or symbols like CSI-RS. A beam pattern (in particular, an angular and/or spatial distribution and/or field structure) may be associated to a port. An angular distribution may be represented by a two-dimensional/plane representation and/or a three-dimensional distribution, e.g. pertaining to a spatial or solid angle. Signaling may be associated to a part of the beam pattern.

A beam pattern may in particular comprise a main lobe of radiation. Symbols or signals of signaling (respectively a port) may be defined to allow estimation of the associated channel by a receiver, e.g. a terminal like a UE. Estimation of a channel may comprise measurements of the signaling, in particular reference signals associated to the channel and/or port. Such measurements may comprise measurements related to amplitude and/or phase and/or frequency and/or duration and/or Signal-to-Noise (e.g., SINR, SIR and/or SNR). Different subarrays of an antenna array may differ in at least one antenna element.

The term "expanded" as used herein may be considered to refer to a situation in which antenna expansion is used and/or more antenna elements are used at least for one port or signaling than intended by an original precoder or port. In particular, an expanded phase difference refers to a phase difference when using expanded precoders or antenna expansion, not that the expanded phase difference is somehow expanded in value or magnitude.

Obtaining a precoder may comprise any form of acquiring information indicating the precoder, e.g. reading from a memory, receiving data indicating the precoder, and/or determining the precoder, e.g. based on received data like a measurement report. Reference signaling may comprise one or more reference signals or symbols. Reference signals may be adapted or intended for a receiver (e.g., a terminal) to perform measurements on and/or to provide a measurement report on. Reference signals may be defined by a standard, e.g. CSI-RS defined by LTE. Measurement reporting and/or providing a measurement report may generally comprise transmitting a measurement report, in particular to a source/transmitter of reference signaling, e.g. a network node, and/or performing measurements, e.g. on reference signaling, and/or evaluating measurements (e.g., processing the measurement results). A measurement report may be based on the performed measurements and/or the evaluating. Generally, reference signaling may be cell-specific or terminal-specific. CSI-RS may be considered an example for terminal-specific reference signaling.

Configuring (e.g., with or for a configuration) a device like a terminal or network node may comprise bringing the device into a state in accordance with the configuration. A device may generally configure itself, e.g. by adapting a configuration. Configuring a terminal, e.g. by a network node, may comprise transmitting a configuration or configuration data indicating a configuration to the terminal, and/or instructing the terminal, e.g. via transmission of configuration data, to adapt the configuration configured.

A configuration may in particular pertain to measurement reporting, e.g. to a CSI process. Measurement reporting may generally pertain to specific signaling (or an associated port), which may be indicated or configured to the terminal by the network or network node, e.g. by transmitting corresponding configuration data. Measurement reporting may generally indicate a preferred port or port combination (or precoder or precoder combination) to be used, which may be referred to as port or precoder selection.

A CSI process may generally comprise receiving, from a network node, reference signaling (CSI-RS), and providing a measurement report based on the received reference signaling. The measurement report may in particular indicate or comprise CSI information, in particular CQI (Channel Quality Information), PMI (Precoding Matrix Indicator) and/or RI (Rank Indicator).

A network node of or for a wireless communication network may be a node adapted for wireless and/or radio communication, e.g. a radio network node. Such a node may generally be a base station, which may be adapted for radio communication with one or more terminals. A network node may in particular be an eNodeB (in particular according to LTE or a related standard). It may be considered that a network node is part of a Radio Access Network (RAN). A network node and/or RAN may be connected or connectable to a core network. Generally, a network node may comprise control circuitry and/or radio circuitry and/or be connected or connectable to antenna circuitry and/or an antenna array. A network node and/or associated circuitry like its control circuitry and/or radio circuitry may be adapted for beamforming and/or use of an antenna array with a plurality of antenna elements.

A terminal may be a terminal device adapted for wireless and/or radio communication, in particular a user equipment (e.g., according to LTE). A terminal may be adapted to communicate with and/or via a Radio Access Network (RAN) and/or a network node. Generally, a terminal may comprise control circuitry and/or radio circuitry and/or be connected or connectable to antenna circuitry and/or an antenna array.

Control circuitry may comprise one or more control devices like (micro-)processors (and/or processor cores) and/or controllers and/or microcontrollers and/or ASICs (Application Specific Integrated Circuit) and/or FPGAs (Field-Programmable Gate Array) and/or any integrated circuitry suitable for control functions as described herein. Control circuitry may comprise and/or be connected or connectable to a memory arrangement, which may comprise one or more memories readable by one or more control devices of the control circuitry. A memory may generally be a volatile or non-volatile memory, e.g. Random Access Memory (RAM) and/or Read-Only Memory (ROM) and/or flash memory and/or buffer memory and/or cache memory and/or optical memory and/or magnetic memory. A storage medium may comprise one or more of such memories.

Radio circuitry may be adapted for transmitting and/or receiving and/or transceiving signaling, in particular wireless and/or radio signaling. It may comprise one or more transmitters and/or receivers and/or transceivers. Radio circuitry may be controllable by, and/or be connected or connectable to, control circuitry. Generally, radio circuitry may be connected or connectable to antenna circuitry and/or an antenna array, to transmit and/or receive signaling utilising the antenna array, respectively antenna element/s and/or subarray/s thereof. Radio circuitry may comprise suitable components (e.g., pre-amplifying and/or amplifying circuitry and/or measurement circuitry and/or oscillatory circuitry and/or power control circuitry and/or filtering circuitry) for transmission and/or reception and/or detection and/or processing signaling, in particular controlled by and/or in cooperation with control circuitry. Processing signaling may generally comprise detecting and/or encoding/decoding and/or modulating/demodulating signaling.

Antenna circuitry may comprise an antenna array and/or corresponding circuitry.

Some useful abbreviations comprise

| Abbreviation | Explanation |
| --- | --- |
| BA | Beam Angle |
| BS | Base Station |
| CSI | Channel-State Information |
| CSI-RS | CSI reference signals |
| CQI | Channel-Quality Indicator |
| DBF | Differential Beamforming |
| dpBF | Dual Polarized Beamforming |
| LoS | Line of Sight |
| LTE | Long-Term Evolution |
| RAS | Reconfigurable Antenna Systems |
| RB | Resource Block |
| RI | Rank Indicator |
| RX | Reception, reception-related, Receiver |

-continued

| Abbreviation | Explanation |
| --- | --- |
| SINR | Signal-to-Interference and Noise Ratio |
| SIR | Signal-to-Interference Ratio |
| SNR | Signal-to-Noise Ratio |
| TX | Transmission, transmission-related, Transmitter |
| UE | User Equipment |

These abbreviations may be considered to be based on LTE standard use, if appropriate.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a network node in a wireless communication network, the method comprising:
obtaining a first precoder and/or first beam pattern indication, and a second precoder and/or second beam pattern indication, the first precoder and/or first beam pattern indication being associated with beamformed transmission of first signaling utilizing a first antenna subarray, and the second precoder and/or second beam pattern indication being associated with beamformed transmission of second signaling utilizing a second antenna subarray;

wherein a first phase center is associated with the first signaling and a second phase center is associated with the second signaling, the first phase center and the second phase center having a phase center difference;

the method further comprising transmitting the first signaling on a first expanded antenna subarray utilizing a first expanded precoder, and transmitting the second signaling on a second expanded antenna subarray utilizing a second expanded precoder;

wherein a first expanded phase center is associated with the transmitted first signaling, and a second expanded phase center is associated with the transmitted second signaling, the first expanded phase center and the second expanded phase center having an expanded phase center difference; and wherein the phase center difference corresponds to the expanded phase center difference.

2. A network node for a wireless communication network, the network node comprising:

radio circuitry configured for signal transmission from one or more antenna arrays or subarrays; and processing circuitry configured to:

obtain a first precoder and/or first beam pattern indication, and a second precoder and/or second beam pattern indication, the first precoder and/or first beam pattern indication being associated with beamformed transmission of first signaling utilizing a first antenna subarray, and the second precoder and/or second beam pattern indication being associated with beamformed transmission of second signaling utilizing a second antenna subarray, wherein a first phase center is associated with the first signaling and a second phase center is associated with the second signaling, the first phase center and the second phase center having a phase center difference;

transmit, via control of the radio circuitry, the first signaling on a first expanded antenna subarray utilizing a first expanded precoder, and transmit, via control of the radio circuitry, the second signaling on a second expanded antenna subarray utilizing a second expanded precoder, wherein a first expanded phase center is associated with the transmitted first signaling, and a second expanded phase center is associated with the transmitted second signaling, the first expanded phase center and the second expanded phase center defining an expanded phase center difference, and wherein the phase center difference corresponds to the expanded phase center difference.

3. The network node according to claim 2, the first expanded antenna subarray comprising more antenna elements than the first antenna subarray, and/or the second expanded antenna subarray comprising more antenna elements than the second antenna subarray.

4. The network node according to claim 2, wherein the first signaling and/or the second signaling comprises channel state information reference signal (CSI-RS) signaling.

5. The network node according to claim 2, wherein the first signaling and/or the first precoder is represented by, and/or associated with, a first port, and the second signaling and/or the second precoder is represented by, and/or associated with, a second port.

6. The network node according to claim 2, wherein the processing circuitry is configured to perform one or more reiterations, such that for each iteration after the first, the first expanded precoder of the iteration before is used instead of the first precoder, and the second expanded precoder of the iteration before is used instead of the second precoder.

7. The network node according to claim 2, wherein the polarization of the first subarray and/or the first signaling is orthogonal to the polarization of the second subarray and/or signaling.

8. The network node according to claim 2, wherein the processing circuitry is configured to transmit the first signaling and the second signaling based on a measurement reporting received from a terminal, in response to an earlier iteration of transmitting.

9. The network node according to claim 2, wherein the first signaling comprises two reference signals and the second signaling comprises two reference signals.

10. The network node according to claim 9, wherein the first signaling has orthogonal polarization to the second signaling.

11. The network node according to claim 9, wherein the first signaling and the second signaling are transmitted using the same antenna subarray.

12. The network node according to claim 2, wherein the processing circuitry is configured to configure a terminal for providing a measurement report based on the first signaling and the second signaling.

* * * * *